Patented July 13, 1943

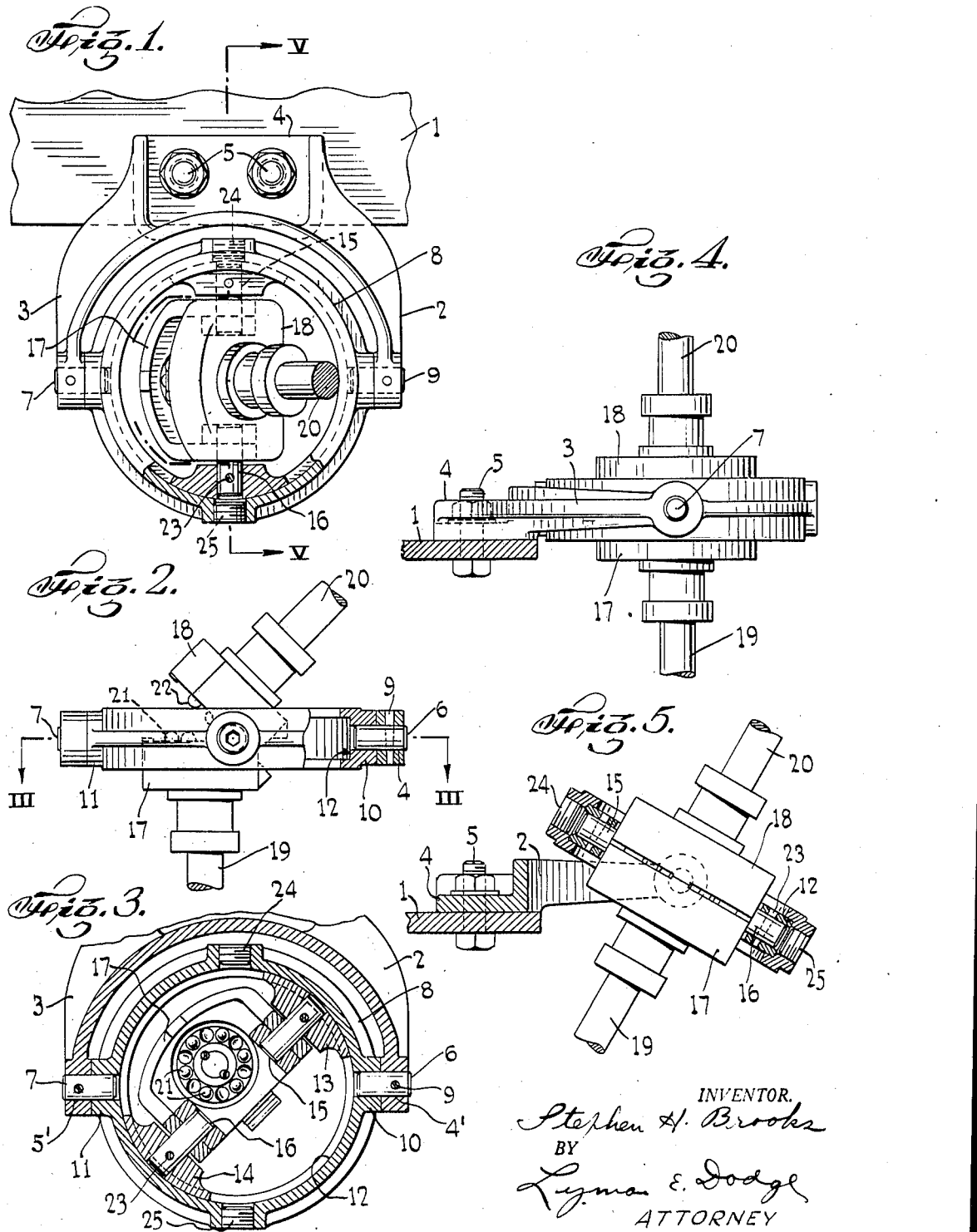

2,324,062

UNITED STATES PATENT OFFICE 2,324,062

FLEXIBLE JOINT

Stephen H. Brooks, New York, N. Y.

Application September 11, 1942, Serial No. 457,917

5 Claims. (Cl. 74—380)

This invention relates to shaft joints, particularly shaft joints of the hinged type, and more particularly a combination of such a joint with a support.

A principal object of this invention is the production of a device of the type specified which is so constructed and arranged that interconnected shafts may have three movements each at a right angle to the others.

Further objects and advantages will appear as the description of the invention and the particular physical embodiment selected to illustrate the invention progresses, and the novel features will be particularly pointed out in the appended claims.

In describing the invention in detail, and the particular physical embodiment selected to illustrate the invention, reference will be had to the accompanying drawing and the several views thereon, in which like characters of reference designate like parts throughout the several views, and in which:

Figure 1 is a top plan view of the device, including a hinged joint, embodying the invention with some parts broken away to more clearly show the construction; Fig. 2 is a front elevational view of the device as shown by Fig. 1; Fig. 3 is a cross sectional view of the device as shown by Fig. 1 on the plane indicated by the line III—III of Fig. 2, viewed in the direction of the arrow at the ends of the line; Fig. 4 is a side elevational view of the device as shown by Fig. 1, viewed from the left hand side thereof, but with the interconnected shafts thereof shown in line; Fig. 5 is a cross sectional view of the device as shown by Fig. 1 on the plane indicated by the line V—V of Fig. 1, viewed in the direction of the arrows at the ends of the line.

Numeral 1 designates a fixed object. To this fixed object are attached separated arms 2 and 3. These arms are preferably integrally connected, as by 4, and are rigidly attached, as by bolts 5, to the fixed object 1.

The separated arms 2 and 3 are formed with bores 4' and 5'. These bores are adapted for the reception of trunnions or pivot pins, as 6 and 7. These trunnions or pivot pins act as a pivot for a gimbal ring 8. For the purpose of assembly, it is preferable to pin the trunnions 6 and 7 by pins, as 9, to the bearing members, as 2 and 3 but it is not intended to exclude a construction in which the pivot pins 6 and 7 are pinned to the gimbal ring 8.

The pivot pins 7 and 9 allow the gimbal ring 8 to oscillate about their longitudinal axis in a plane at a right angle to the longitudinal axis and so allow anything which is borne by the gimbal ring 8 to so oscillate, as the hinged joint and shafts attached thereto.

The gimbal ring 8 is provided with bearings, as 10 and 11, cooperating with the pivot pins 7 and 9 and is in the form of a circular ring. The inner surface of the ring is formed with a groove 12 for the reception of arcuate hinge pin supports 13 and 14. These supports have a portion nicely fitting within the groove so that they may slide around in the grooves about the center of the ring.

At 15 and 16 are shown the hinge pins of a hinged joint including two casing members as 17 and 18, two shafts as 19 and 20, and two ball gears, one upon each shaft, as 21 and 22. This hinged joint may be considered as identical with the hinged joint shown described in the claims in my Patent No. 2,281,913, granted May 5, 1942.

It is preferred to pin the hinge pivots 15 and 16 to the arcuate hinge pin supports, as 13 and 14, by pins, as 23, although, of course, it is not intended to exclude a construction in which the hinge pins are pinned to one of the casing members, as 17.

For the purpose of facilitating and making possible the convenient assembly of the parts, the gimbal ring 8 is orificed at diametrically opposite points, as at 24 and 25, providing through bores through which the hinged joint pivot pins may be passed.

In Fig. 4, the shafts 19 and 20 are shown as being in line and at substantially a right angle to the general plane of the separated bearing arms 2 and 3. In Fig. 5, the shafts, 19 and 20, are again shown as in line but both at an angle to the general plane of the separate bearing arms 2 and 3.

From the above description it will now be seen that the invention provides a shaft hinged joint by which two shafts may be connected and that, as is usual, the hinged joint allows the two shafts to assume various angular positions one to the other in a plane passing through the longitudinal axis of both shafts, that is it allows those shafts to oscillate freely in planes at a right angle to the general plane of the gimbal ring 8.

It will also be seen that the shafts and joint may rotate together about the center of the gimbal ring 8 so as to bring those shafts into any plane at a right angle to gimbal ring 8 if that plane passes through the center thereof, due to the sliding of the arcuate members 13 and 14.

It will also be understood from the above description that shafts and joint together may oscillate in a plane at a right angle to the general plane of the separated bearing members 2 and 3 due to the capability of oscillation of the gimbal ring 8 on the trunnions.

The above described and explained construction provides a means by which two shafts may be connected whereby one may transmit rotary motion to the other and whereby, either due to imperfect alignment or subsequent shifting of the fixed support 1, stresses which would otherwise be set up are relieved due to the free motion of the parts in the several planes mentioned thereby obviating one of the outstanding difficulties which has heretofore been encountered when shafts have been connected by flexible couplings, or hinged joints.

Although I have particularly described one particular physical embodiment of my invention, it is desired to have it understood that the form selected is merely illustrative and does not exhaust the possible physical embodiments of the idea and means underlying my invention.

What is new and desired to secure by Letters Patent of the United States, is:

1. A support for a shaft joint of the type including hinge pins upon which shafts may oscillate, having, in combination: two separated bearing members; means for securing the bearing members immovably to a fixed object; a gimbal ring formed with a groove in its inner surface; means for allowing the gimbal ring to oscillate about the longitudinal axes of the bearings; arcuate pin supports positioned in the groove of the gimbal ring; each support adapted to support the hinge pin of a hinged shaft joint whereby when the shaft joint is so supported the shafts will be free to move together with the joint rotatably about the center of the gimbal ring and in addition to oscillate about the hinge pins and also may oscillate together with the joint about the longitudinal axis of the separated bearings.

2. In a hinged joint support, in combination; a gimbal ring mounted for oscillation on immovable bearings, said gimbal ring provided with a groove in its inner surface; two arcuate supports within the groove, one situated at a diametrically opposite point from the other, each support provided with means for supporting a hinge pin of a hinge joint.

3. In a support for a hinge joint of the type in which there are two shafts; two casings, one surrounding each shaft; two intermeshing gears, one on each shaft; two pivot pins, each adapted to oscillatively support the casings; the combination of two pivot pin supports, one attached to each pivot pin; a circular trackway receiving the pin supports at diametrically opposite points and immovable means to support the trackway whereby it may oscillate only in a plane substantially at a right angle to the supporting axis.

4. In a support for a hinged joint, of the type having casings oscillative about separate hinge pins, in combination; two supports, one for each pivot pin, said supports being positioned at diametrically opposite points on a circle and means including a gimbal ring and pivots therefor supported by a fixed member for supporting the pivot pin supports whereby the joint supported thereby together with any connected shafts may rotate about the center of the diameter.

5. A support for a hinged joint including in combination: means for supporting the hinge pins of the hinged joint whereby the joint may hinge as usual; means for allowing rotative movement of the joint about the center point intermediate the hinges and means supporting the last named means and including a gimbal ring and pivots therefor supported by a fixed member for allowing oscillation of the joint in a plane at a right angle to the plane in which the rotation takes place.

STEPHEN H. BROOKS.